United States Patent
Ishizaki

(10) Patent No.: US 8,930,025 B2
(45) Date of Patent: Jan. 6, 2015

(54) WORK ROBOT

(76) Inventor: Takehiro Ishizaki, Kida-gun (JP)

(*) Notice: Subject to any disclaimer, the term of this patent is extended or adjusted under 35 U.S.C. 154(b) by 1647 days.

(21) Appl. No.: 12/227,175

(22) PCT Filed: May 24, 2007

(86) PCT No.: PCT/JP2007/060642
§ 371 (c)(1),
(2), (4) Date: Nov. 10, 2008

(87) PCT Pub. No.: WO2007/138987
PCT Pub. Date: Dec. 6, 2007

(65) Prior Publication Data
US 2009/0234501 A1    Sep. 17, 2009

(30) Foreign Application Priority Data

May 25, 2006    (JP) .................... 2006-145645

(51) Int. Cl.
| | |
|---|---|
| *B25J 13/08* | (2006.01) |
| *G05B 15/00* | (2006.01) |
| *G06T 1/00* | (2006.01) |
| *G06T 7/00* | (2006.01) |
| *B25J 9/16* | (2006.01) |
| *G06T 7/60* | (2006.01) |

(52) U.S. Cl.
CPC ............ *B25J 9/1697* (2013.01); *G06T 1/0014* (2013.01); *G06T 7/0044* (2013.01); *G06T 2207/30164* (2013.01); *Y10S 901/47* (2013.01)
USPC ........................................... 700/259; 901/47

(58) Field of Classification Search
CPC .......................... B25J 9/1697; G06T 1/0014
USPC ............... 700/259; 382/153; 701/28; 901/47
See application file for complete search history.

(56) References Cited

U.S. PATENT DOCUMENTS

| | | | |
|---|---|---|---|
| 6,256,553 B1 | 7/2001 | Erikkila | |
| 6,490,369 B1* | 12/2002 | Beiman | 382/153 |
| 6,496,754 B2* | 12/2002 | Song et al. | 700/245 |
| 7,151,848 B1* | 12/2006 | Watanabe et al. | 382/141 |
| 2006/0075422 A1 | 4/2006 | Choi et al. | |
| 2006/0221232 A1* | 10/2006 | Yu et al. | 348/449 |
| 2007/0098264 A1* | 5/2007 | Van Lier et al. | 382/199 |

FOREIGN PATENT DOCUMENTS

| | | |
|---|---|---|
| EP | 1524622 A1 * | 4/2005 |
| JP | A-62-028877 | 2/1987 |
| JP | A-09-251544 | 9/1997 |
| JP | A-10-260713 | 9/1998 |
| JP | A-2000-501054 | 2/2000 |
| JP | A-2001-041709 | 2/2001 |
| JP | A-2001-246582 | 9/2001 |
| JP | A-2003-231078 | 8/2003 |

(Continued)

*Primary Examiner* — Khoi Tran
*Assistant Examiner* — Dale Moyer
(74) *Attorney, Agent, or Firm* — Oliff PLC

(57) ABSTRACT

A work robot for executing a work for operating an object includes a robot body for capturing an image including the object. During a teach mode, the captured image is correlated with an operation content taught by an operator and held. During a work mode, the captured image is acquired, an image similar to the acquired image is searched, and the object is operated according to the operation content correlated with the image captured in the past which has been found as a result of the search.

15 Claims, 9 Drawing Sheets

(56) References Cited

FOREIGN PATENT DOCUMENTS

| | | |
|---|---|---|
| JP | A-2003-305676 | 10/2003 |
| JP | A-2004-106079 | 4/2004 |
| JP | A-2006-003263 | 1/2006 |
| JP | A-2006-123161 | 5/2006 |

* cited by examiner

| IMAGE DATA | SEARCH DATA | OPERATION CONTENT |
|---|---|---|
| aaaa | bbbb | cccc |
| dddd | eeee | ffff |
| ⋮ | ⋮ | ⋮ |

| COORDINATE OF TOP LEFT OF REGION | LINE ELEMENT PATTERN |
|---|---|
| $x_0, y_0$ | 1 |
| $x_1, y_1$ | 5 |
| ⋮ | ⋮ |

FIG. 9

| LINE ELEMENT PATTERN | COORDINATE OF TOP LEFT OF REGION |
|---|---|
| 1 | $(x_0, y_0), (x_2, y_2)$ ⋯ |
| 2 | $(x_5, y_5)$ |
| 3 | $(x_7, y_7)$ ⋯ |
| ⋮ | ⋮ |

FIG. 10

| IMAGE DATA | SEARCH DATA | OPERATION CONTENT |
|---|---|---|
| (A) | pppp | FORWARD MOVEMENT |
| (B) | qqqq | LOWER ARM<br>OPEN PACKET |
| (C) | rrrr | CLOSE PACKET<br>LIFT ARM |
| (D) | ... | ... |

FIG. 12

WORK ROBOT

TECHNICAL FIELD

The present invention relates to a work robot which executes a work for a target to be operated.

BACKGROUND ART

In recent years, various robots are commercially available, including, for example, robots which are remotely controlled by humans in order to execute a work at a location which is dangerous for humans and robots which assembles according to a predetermined program.

In these remote-controlled robots, the operation requires expertise, and the convenience is low. In addition, in the case of robots which operate according to a predetermined program, the work target must be placed at a predetermined position. Therefore, the degree of freedom is low and the usage situation is limited.

DISCLOSURE OF INVENTION

In view of the above-described circumstances, robots are desired which can autonomously operate with minimum human operations, in order to improve the maneuverability and convenience and enlarge the range in which the robot can be used.

The present invention was conceived in view of the above-described circumstances, and an object of the present invention is to provide a work robot which can autonomously operate with minimum human operations.

In order to achieve at least the above-described problem of the related art, according to one aspect of the present invention, there is provided a work robot which executes a work to operate a target, the work robot comprising an image-capturing unit which captures an image including the target, a storage unit which stores, during teaching, an image captured by the image-capturing unit and an operation content taught by an operator in correlation to each other, and a controlling unit which acquires, during work, an image captured by the image-capturing unit, searches the storage unit for an image which is similar to the acquired image, and operates the target based on an operation content correlated to an image found from the storage unit as a result of the search.

BRIEF DESCRIPTION OF DRAWINGS

FIG. 9 is an explanatory diagram showing an example of a table created in an operation of a pre-recording process in a work robot according to a preferred embodiment of the present invention.

FIG. 10 is an explanatory diagram showing an example of search data created by a remote control device of a work robot according to a preferred embodiment of the present invention.

FIG. 12 is an explanatory diagram showing an example of a teaching database created by a remote control device of a work robot according to a preferred embodiment of the present invention.

BEST MODE FOR CARRYING OUT THE INVENTION

In a work robot according to a preferred embodiment of the present invention, an autonomous operation is enabled by recalling a stored image based on a captured image and executing a work correlated to the recalled image. In general, a Case-Based Reasoning (CBR) and Memory-Based Reasoning (MBR) are techniques used for realization of a virtual agent which operates on a computer. The present embodiment is conceived perceiving that the CBR and MBR are effective in control of an actual work robot. In other words, according to one configuration of the present embodiment, the work is executed according to a result of reasoning through CBR and MBR.

Figure 1:
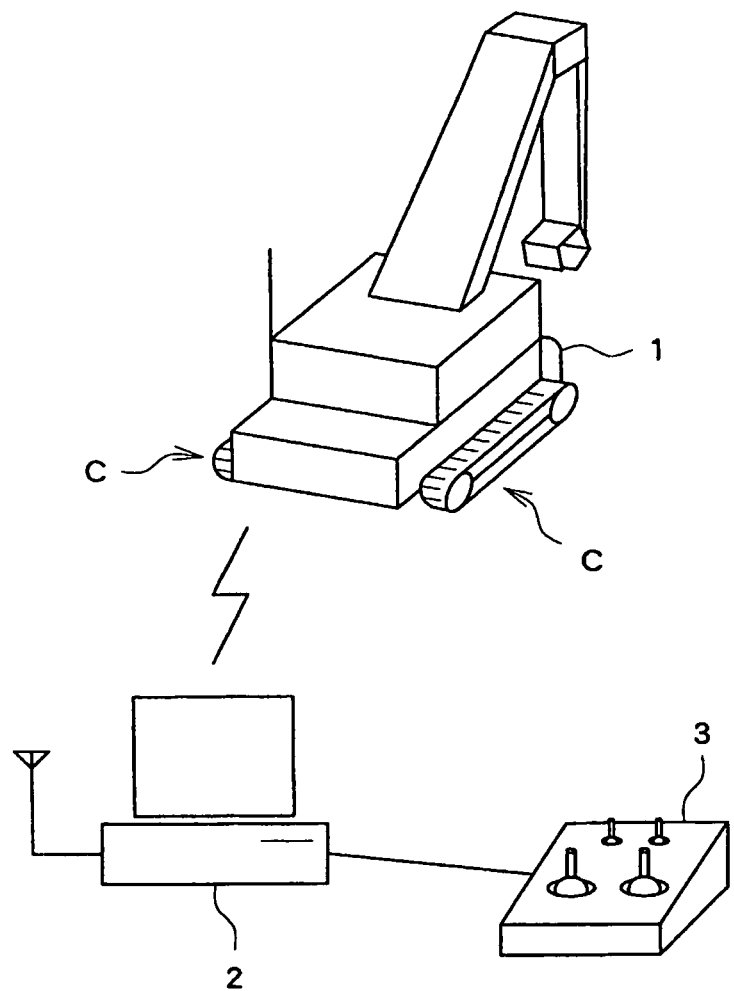
FIG. 1 is a schematic structural diagram showing an example structure of a work robot according to a preferred embodiment of the present invention.
Figure 2:
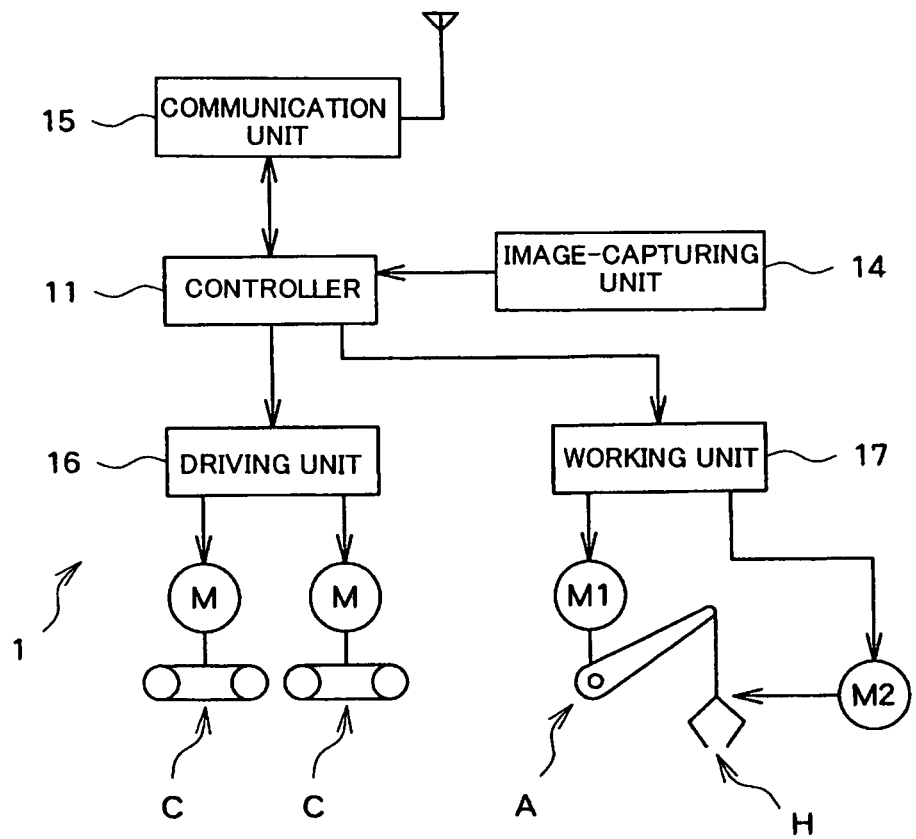
FIG. 2 is a block diagram showing an example structure of a robot body of a work robot according to a preferred embodiment of the present invention.

A preferred embodiment of the present invention will now be described with reference to the drawings. As shown in FIG. 1, a work robot according to a preferred embodiment of the present invention comprises a robot body 1, a remote control device 2, and a remote operation device 3. Moreover, as shown in FIG. 2, the robot body 1 comprises a controller 11, an image-capturing unit 14, a communication unit 15, a driving unit 16, and a working unit 17. The driving unit 16 comprises a crawler C which is provided on each of left and right side surfaces of the robot body 1 for self-propelling of the robot body 1 and two motors M provided corresponding to the crawlers C and which can independently rotationally drive the crawlers C. The crawler C for self-propelling is not a necessary component.

Figure 3:
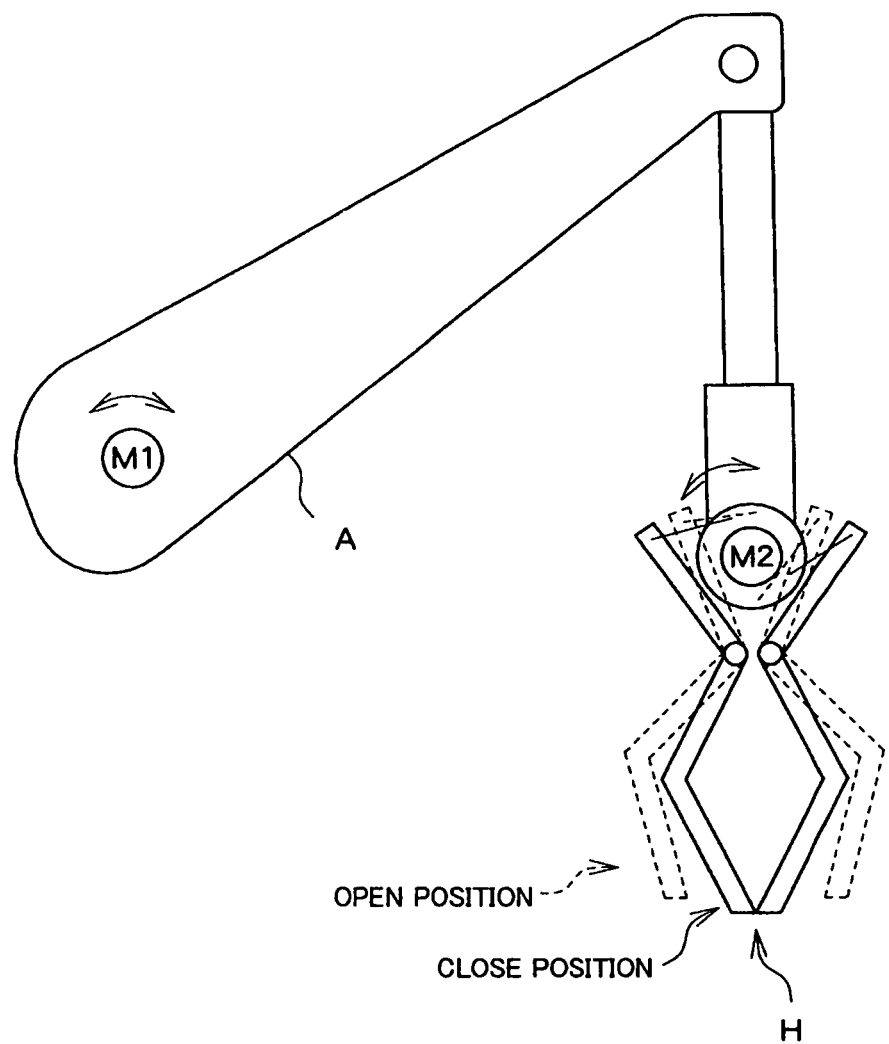
FIG. 3 is an explanatory diagram showing an example structure of an arm and a packet portion of a robot body according to a preferred embodiment of the present invention.

As shown in FIG. 3, the working unit 17 comprises an arm A and a packet H which holds a target. The arm A comprises a first arm unit which is supported on the robot body 1 and which has an angle of elevation controllable by a motor M1, and a second arm which is supported near the tip of the first arm unit and which suspends in a vertically downward direction. The holding unit H is provided at the end of the second arm.

In the packet H, two packet members having an approximate Z-shape are placed opposing each other, and the packet member of the Z-shape is driven between an open position (position shown in FIG. 3 with a dotted line) and a closed position (position shown in FIG. 3 with a solid line) by a motor M2.

Figure 4:
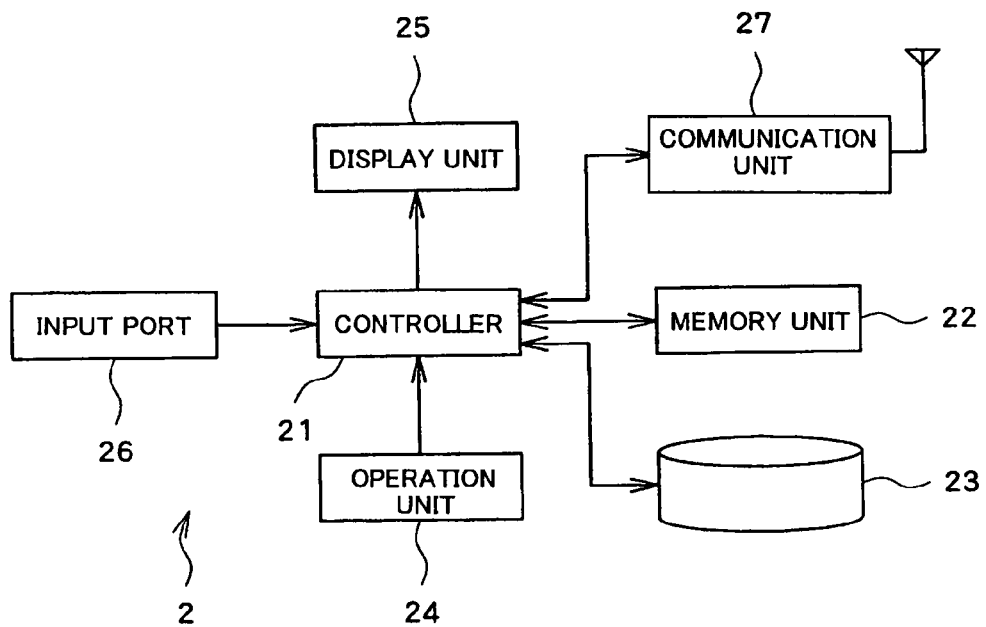
FIG. 4 is a block diagram showing an example structure of a remote control device of a work robot according to a preferred embodiment of the present invention.
Figure 5:
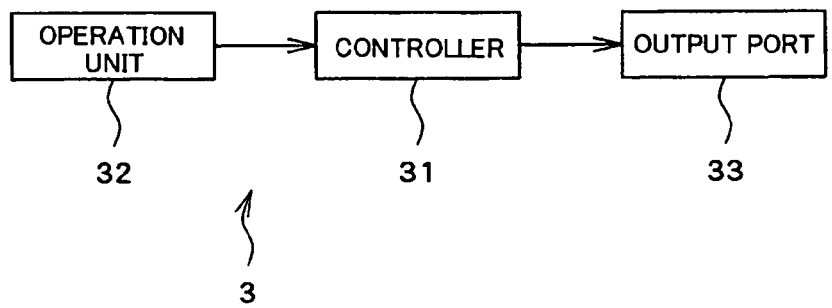
FIG. 5 is a block diagram showing an example structure of a remote operation device of a work robot according to a preferred embodiment of the present invention.

As shown in FIG. 4, the remote control device 2 comprises a controller 21, a recording unit 22, a storage unit 23, an operation unit 24, a display unit 25, an input port 26, and a communication unit 27. As shown in FIG. 5, the remote operation device 3 comprises a controller 31, an operation unit 32, and an output port 33.

The controller 11 of the robot body 1 is a microcomputer or the like and controls various units such as the driving unit 16 and the working unit 17 according to operations which are input from the remote control device 2 through the communication unit 15. For example, when a movement instruction such as forward movement, backward movement, rotation to right, and rotation to left is received, the controller 11 controls the driving unit 16, to move the robot body 1 in the instructed direction. In the present embodiment, because the driving unit 16 comprises two crawlers (crawlers) C, the controller 11 controls the rotation direction and speed of the crawlers according to the input instruction operations, to move the robot body 1 forward or backward, or rotate to the left or to the right, etc. The movement control of the robot body 1 through driving of the crawlers is well known, and will not be described in detail here.

The controller 11 receives an instruction to lift or lower the arm of the working unit 17 or an instruction to open or close the packet H from the remote control device 2, and controls the motors M1 and M2 of the working unit 17.

The controller 11 transmits the image data captured by the image-capturing unit 14 through the communication unit 15 to the remote control device 2.

The image-capturing unit 14 contains at least one CCD camera or the like, and periodically captures (for example, every 1/30 seconds) an image of a predetermined range in the direction of travel of the robot body 1 (in general, including, at the center portion of the range, the position of the packet when the arm of the working unit 17 is lowered) and outputs the digital image data acquired through the image-capturing to the controller 11.

The communication unit 15 includes, for example, at least one wireless LAN (Local Area Network) interface, and receives data of an instruction operation from the remote control device 2 to the robot body 1 and outputs to the controller 11. The communication unit 15 also transmits and outputs the image data which is input from the controller 11 to the remote control device 2.

The remote control device 2 can be realized using a personal computer, and the controller 21 of the remote control device 2 is, for example, an MPU (Micro Processing Unit) and operates according to a control program of the robot stored in the memory unit 22. In the present embodiment, when the controller 21 executes the control program of the robot, the controller 21 allows the operator to select one of two modes including a teaching mode and a working mode. In the teaching mode, the content of the instruction operation executed by the operator is transmitted to the robot body 1, and image data received from the robot body 1 and the content of the instruction operation executed by the operator when the image data is received are stored in correlation to each other in the storage unit 23 as teaching data.

In the working mode, with the image data received from the robot body 1 as a key, similar image data is searched from teaching data, and content of an operation executed in the past by the operator which is stored in correlation to the found similar image is transmitted to the robot body 1. The details of the process of the controller 21 will be described later.

The memory unit 22 comprises a recording element such as a RAM (Random Access Memory) and an EEPROM (Electrically Erasable, Programmable ROM). The memory unit 22 stores a program executed by the controller 21. The memory unit 22 also operates as a work memory of the controller 21. The storage unit 23 is a hard disk drive or the like, and holds the teaching database which is created during execution of the operation of the teaching mode by the controller 21.

The operation unit 24 is a keyboard or the like, and receives an instruction operation of the operator and outputs the content of the instruction operation to the controller 21. The operator inputs an instruction to switch between the teaching mode and the working mode through the operation unit 24. The display unit 25 is a display or the like, and displays information according to an instruction by the controller 21.

The input port 26 is, for example, the RS-232C or USB, and outputs a signal which is input from an external device connected to the input port 26 to the controller 21. In the present embodiment, the remote operation device 3 is connected to the input port 26, and the input port 26 receives a signal which is output from the remote operation device 3 and outputs to the controller 21.

The communication unit 27 is, for example, a wireless LAN interface, and transmits an instruction for the robot body 1 which is input from the controller 21 to the robot body 1. The communication unit 27 also receives the image data transmitted from the robot body 1 and outputs to the controller 21.

When the image-capturing unit 14 outputs an analog signal, for example, an NTSC signal, the communication unit 15 on the robot body 1 may comprise a device which transmits a television signal in which the NTSC signal is modulated and the NTSC signal may be transmitted without further processing. In this case, the communication unit 27 also may comprise a device which receives a television signal, demodulate the television signal to acquire the NTSC signal, digitize the NTSC signal to create image data, and output the image data to the controller 21.

The controller 31 of the remote operation device 3 is a microcomputer or the like, and outputs a signal indicating an operation content of the operator executed in the operation unit 32 through the output port 33. The operation unit 32 may be a general proportional controller of a radio control unit, and comprises two joysticks which can be tilted forward and backward to control forward and backward movements of the two crawlers provided at the left and the right with respect to the direction of travel, in order to control the travel of the robot body 1. The operation unit 32 further comprises two joysticks which can be tilted forward, backward, right, and left, in order to control the direction and angle of the arm and the opening and closing of the packet. The operation unit 32 outputs digital signals corresponding to the angles of tilts of these joysticks to the controller 31. For example, tilt angles in the forward and backward direction are acquired from two joysticks for controlling the crawler, and digital values indicating these angles are output. In addition, tilt angles in the forward and backward direction and tilt angles in the right and left direction are acquired from the joysticks for controlling the direction of the arm or the like, and digital values indicating these angles are output. For the operation of the robots using these joysticks, a method defined in, for example, the JIS standards may be used, and, thus, the operation will not be described in detail.

The output port 33 outputs the signal which is output by the controller 31. In the present embodiment, the output port 33 is connected to the input port 26 of the remote control device 2, and outputs the signal to the remote control device 2.

Next, contents of the processes execute by the controller 21 of the remote control device 2 will be described. Because the controller 21 of the present embodiment executes different processes during teaching and working, these processes will be separately described.

[Operation During Teaching]

Figure 6:
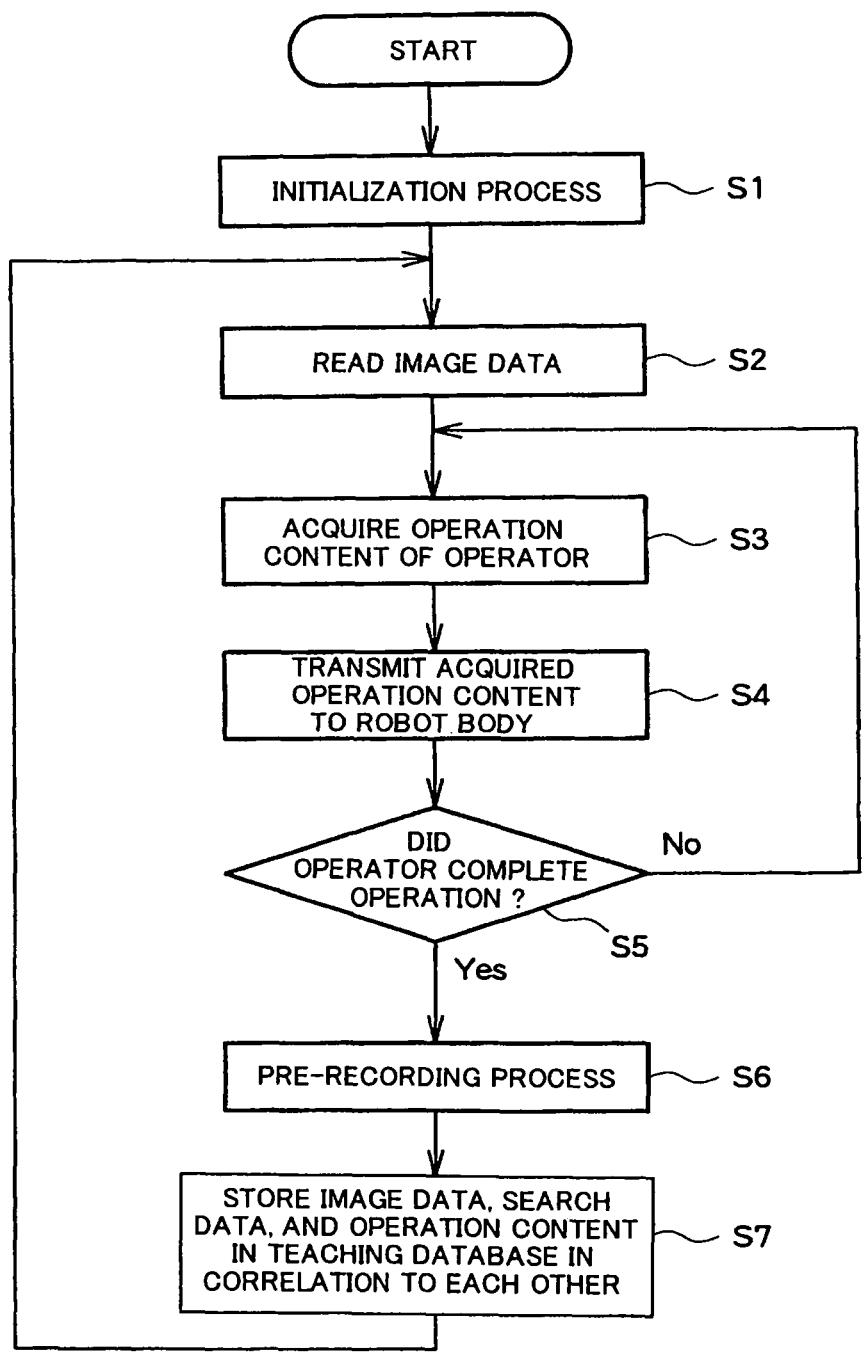
FIG. 6 is a flowchart showing an example operation during teaching of a remote control device of a work robot according to a preferred embodiment of the present invention.

When the operator operates the operation unit 24 to instruct an operation in the teaching mode, the controller 21 starts a process as shown in FIG. 6, and first executes an initialization process, for example, to secure, in the memory unit 22, a buffer for reading an image and an operation data buffer for accumulating the operation signals (S1). Then, the controller 21 reads the image data received through the communication unit 27 and stores in the memory unit 22 (S2).

In addition, the operator is operating the operation unit 32 of the remote operation device 3, and the controller 21 receives an input of a signal which is output by the remote operation device 3 through the input port 26, and accumulates and stores in the operation data buffer of the memory unit 22 (S3). This signal is a signal indicating a content of the operation of the operator, and the controller 21 transmits the signal related to the content of the operation through the communication unit 27 to the robot body 1 (S4).

The controller 21 checks whether or not the operator has completed the operation (S5). The controller 21 checks, for example, whether signals are not input for a predetermined period of time. If the operator has not completed the operation, the process returns to S3 and is continued. If, on the other hand, the operator has completed the operation, search data which is used for search of image data is created based on image data which is read in step S2 (pre-recording process; S6).

The controller 21 correlates the search data created in this process, the read image data, and the content recorded in the operation data buffer (hereinafter called "operation content data"), and holds the data in the storage unit 23 as a teaching database (S7).

The controller 21 clears the operation data buffer, returns to step S2, and continues the process. The controller 21 repeatedly executes this process during teaching until the operator instructs termination of the program execution.

Figures 7, 8:
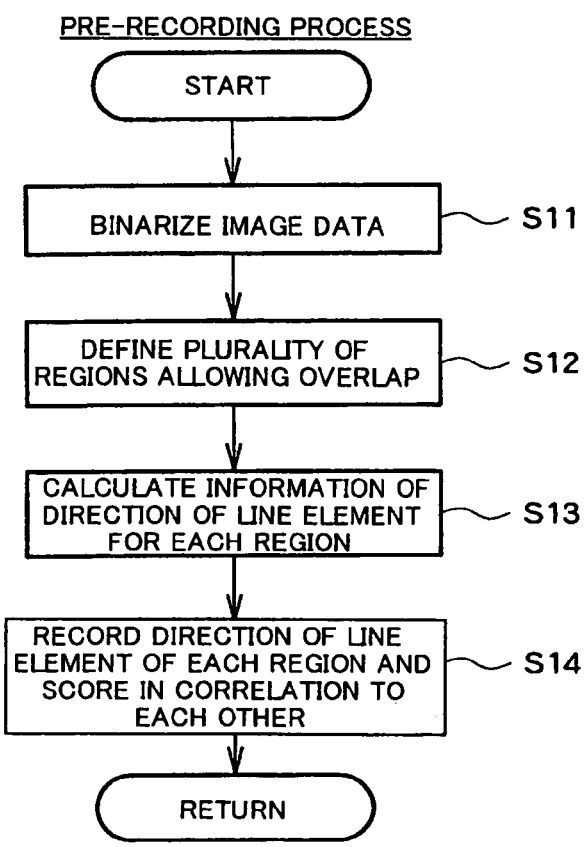
FIG. 7 is an explanatory diagram showing an example structure of a teaching database held by a remote control device of a work robot according to a preferred embodiment of the present invention.
FIG. 8 is a flowchart showing an example of a pre-recording process during teaching of a remote control device of a work robot according to a preferred embodiment of the present invention.

As a result, in the storage unit 23, the image data received from the time when the operator instructs the operation in the teaching mode until the operator instructs interruption of the program execution, the search data, and the operation executed by the operator when the image data is captured are stored in correlation to each other, as the teaching database (FIG. 7).

[Example of Search Data]

Here, for the search data which is used for searching the image data, various methods may be employed as long as a similar image can be searched, such as, for example, a method which uses a neural network such as neocognitron and methods which use color frequency histogram. In the present embodiment, as the method of searching the similar image, a process to "recall" an image having a high correlation is used. As a concrete example of such a process, here, neocognitron may be used.

In the neocognitron, regardless of the image-capturing position of the target, the type and number of targets can be detected. Because of this, the possibility of the image data not being searched due to a slight orientation deviation is removed. In the present embodiment, the search data may be used as a pattern which is used for recalling the image data during work.

However, a multilayer structure which is used for recalling by neocognitron is generally complex, and is currently not suited for quick recalling of an operation based on a captured image such as operation of a work robot. One of characteristics in the present embodiment, on the other hand, is that, as an example of search data, a directional line element characteristic amount is extracted from the image data and is set as the search data. In this manner, in the present embodiment, because the directional line element characteristic amount is used, even when the size of the image data (number of pixels included in the image data) is increased, the amount of increase in the process load can be inhibited. This is because the number of directional line elements does not necessarily depend on the number of pixels of the image data.

In the pre-recording process in which the search data is created, as shown in FIG. 8, the controller 21 binarizes the image data (S11), defines a region of a predetermined number of pixels in which overlap of each other is permitted (S12), and information related to the direction of the line elements included in each region is created (S13). During the binarization, it is possible to create a histogram of colors included in the targeted image data and change the reference value of binarization according to the histogram. For example, a value of a minimum brightness in which the frequency is greater than or equal to a predetermined threshold value may be extracted in the order of brightness in the histogram, and a midpoint of a range from the minimum brightness to the maximum brightness may be set as the reference value for binarization. Pixels having a value higher than the reference value are set as "white" and pixels having a value less than or equal to the reference value are set as "black (significant pixel)".

Alternatively, in the portion included in the targeted image data, the background portion may be removed. In general, the background has a larger area than the foreground. Thus, it is possible to employ, as the background removal process, a process in which a color corresponding to the most frequent value in the color histogram is removed from the targeted image data.

In the present embodiment, for example, an image in which line segments which intersect with a line segment in a vertical direction with angles of every 10 degrees such as 0 degree, 10 degrees, 20 degrees, . . . are drawn is set as a line element pattern, and a group of line element patterns including these line element patterns is stored in the storage unit 23 in advance.

In step S13 in the process of the controller 21, while the image of each of the regions defined in step S12 is sequentially selected as a region of interest, scores (information indicating the degree of match) between the region of interest and the line element patterns in the group of line element patterns are calculated. Here, the score is determined as a number of pixels in the pixels forming the image of the region of interest and the pixels of the line element pattern in which the corresponding pixels are both significant pixels (pixels forming the extracted line segment or defined line segment).

The controller 21 sets the line element pattern having the highest score as a line element pattern representing the region of interest (information related to a direction of line element included in the region of interest). The controller 21 then includes the information for identifying the region of interest (for example, a coordinate system of the binarized image data and x and y coordinate values of top left of the region of interest), information for identifying the line element pattern representing the region of interest, and the score in the teaching database in correlation to each other, and stores the information in the memory unit 22 (S14).

In step S14, while the region of interest is sequentially selected, the process is repeatedly executed for the number of regions. With this process, the controller 21 creates a list in which selected line element pattern is correlated to the information for identifying each region (FIG. 9). The controller 21 also creates, in order to facilitate search, data in which a list of information for identifying the region of interest correlated to the corresponding line element pattern is correlated to each angle of the line segment represented by the line element pattern (hereinafter referred to as "phase order data") as search data (FIG. 10), and includes and stores the search data in the teaching database.

[Operation During Work]

Figure 11:
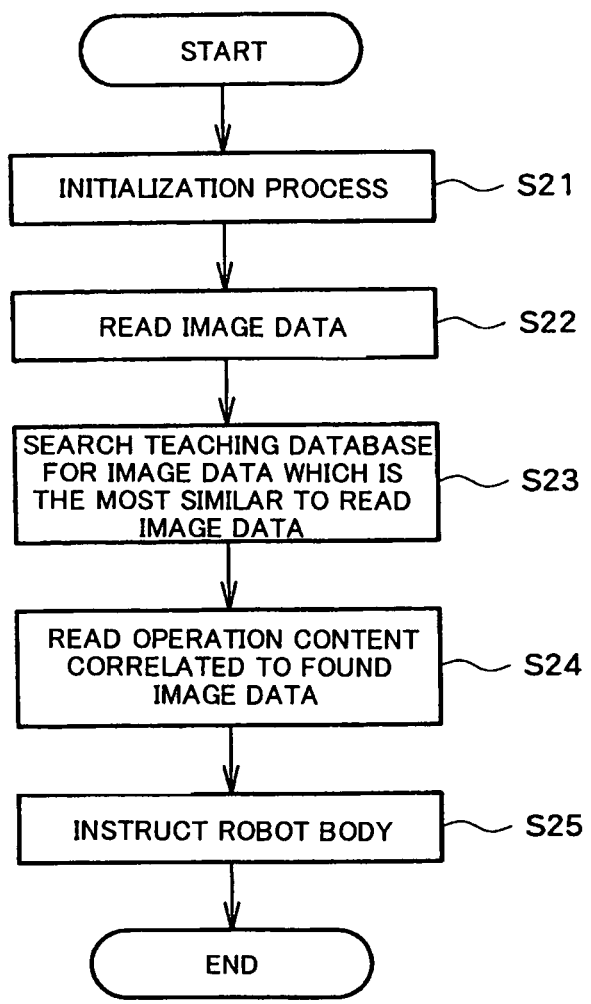
FIG. 11 is a flowchart showing an example operation during work of a remote control device of a work robot according to a preferred embodiment of the present invention.

Next, an operation during work using the teaching database created through the operation during teaching will be described. When the operator operates on the operation unit 24 to instruct an operation in the working mode, the controller 21 starts a process as shown in FIG. 11, and executes an initialization process such as securing a region for holding the image data (S21). The controller 21 reads the image data to be received through the communication unit 27 and stores the image data in the memory unit 22 (S22), and searches, using the image data which is read in step S22 as a key of search, the teaching database for image data which is most similar to the key (S23).

The controller 21 reads the operation content data correlated to the image data which is the most similar (S24), and transmits a signal instructing the operation indicated by the operation content data through the communication unit 27 to the robot body 1 (S25). The controller 21 then waits for a predetermined period of time, and returns to step S22 and continues the process.

The controller 21 repetitively executes the above-described process, for example, until the operator instructs stopping of the execution of the program. With this process, the robot body 1 is controlled using the image data which is captured from the viewpoint from the robot body 1 and referring to operations when image data which is approximate to the captured image data is captured. In other words, by an experienced operator teaching the operation once or teaching the operation when the work was successful in the past, it is possible to reproduce the operation at the point of time in similar situation, it is not necessary that the operator during the work has expertise in the operation, the convenience can be improved, and the robot can be autonomously operated with minimum human operations.

In the search process in step S23 of the present embodiment, the process of neocognitron as described above is executed. In other words, in the search process of step S23, the controller 21 divides the image data which is acquired in step S22 and which is set as the key into a plurality of blocks, and calculates the directional line element characteristic value of each block. This calculation of the directional line element characteristic value may be executed similar to that during teaching.

The controller 21 also calculates an absolute value of a color difference between each pixel included in the key image data and an adjacent pixel. For example, the controller 21 sequentially selects a pixel included in the key image data as a pixel of interest, and calculates an absolute value of difference of color (distance on color space) between the pixel adjacent to the pixel of interest and the pixel of interest. The difference in color may be, for example, in the case where the pixel of interest is scanned and selected in the raster scan order (order in which pixels are sequentially scanned from a pixel at the top left of the image data in a manner of one line scan from left to right and then a line below this line and from left to right), a difference between the pixel value of the pixel of interest immediately before the current pixel of interest and the pixel value of the current pixel of interest or an average of differences with four nearby pixels.

When the directional line element characteristic value of each block is acquired, the controller 21 sequentially reads the search data stored in the teaching database. Here, an example configuration will be described in which the phase order data (data in which, for each angle of a line segment represented by a line element pattern, a list of information for identifying a region correlated to line element pattern of each angle is correlated) is used as the search data.

The controller 21 refers to the directional line element characteristic value of each block acquired through calculation based on the key image data, and creates data in which, for each angle of a line segment represented by a line element pattern which is predetermined, a list of information for identifying the block which is the directional line element characteristic value correlated to the line element pattern of the corresponding angle is correlated. This data will hereinafter be referred to as comparison target phase order data.

The controller 21 then calculates a difference between a list for each angle of the comparison target phase order data (each of information for identifying a block) and a list included in the read phase order data which is the search data (hereinafter referred to as "search data of interest"). As a concrete example, for a line segment of an angle θ, including a list of (dxi, dyi) (where i=0, 1, 2, . . . ) in the comparison target phase order data and a list of (xj, yj) (where j=0, 1, 2, . . . ) in the phase order data which is the search data, $$\sum_i \sum_j |(x_j, y_j) - (dx_i, dy_j)| \qquad (1)$$

is calculated, and a sum of the calculation result for the angle θ is set as the distance d between the key image data acquired in step S22 and the search data of interest.

The controller 21 may assign weights to the distance d based on a difference between a value (color) of a pixel included in the key image data and the value (color) of a pixel of the image data correlated to the search data of interest in the teaching database. In this case, for the pixels of the key image data and of the image data correlated to the search data of interest, a weighted sum of a sum of absolute values |e| of the differences of the corresponding pixel values and the previously calculated distance d, $$D=\alpha|e|+\beta d$$

is set as a corrected distance D (where α and β are positive weight values).

Alternatively, the controller 21 may determine the corrected distance D through the following calculation. More specifically, the controller 21 calculates, also in the image data related to the search data of interest, an absolute value of difference in color (distance on color space) between the pixel included in the image data and an adjacent pixel. The controller 21 then uses the color difference values cpz and cpdz, of the corresponding pixels of the key image data and the search data of interest, with each peripheral pixels and calculates a difference f=cpz−cpdz.

The controller 21 uses the absolute value |f| of this value f, and may assign weights and add the absolute value |f| to the distance d along with the absolute value of the difference of pixel values |e|, to acquire the corrected distance D with:

$$D=\alpha|e|+\beta d+\gamma|f|$$

(wherein α, β, and γ are positive weight values).

According to this configuration, it is possible to distinguishingly affect the corrected distance D with the case where a portion of significant color difference matches and the case where the portion does not match, and, for example, influence of a portion such as the background which in general has a small color difference can be reduced.

In order to improve the processing speed, it is possible to apply a reducing process to the key image data and the image data correlated to the search data of interest to images of a predetermined size, and to calculate the corrected distance D by a weighted sum of one or both of the sum e of the absolute values of differences of corresponding pixel values and the value f related to the difference from the adjacent pixel and the previously calculated distance d, for each pixel after the reducing process.

The controller 21 executes this process while sequentially selecting each search data as the search data of interest, and calculates the corrected distance D between the key image data and the search data.

The controller 21 selects, as the image data which is the most similar to the key, image data registered in the teaching database in correlation to the search data having the minimum corrected distance D.

[Correction Operation]

The controller 21 may further execute a correction operation in which the selected image data and the key image data are compared and the position of the robot body 1 is moved in a manner described below based on the result of the comparison. For example, averages of amounts of deviation (how many blocks apart) in the x direction and y direction between blocks having the same directional line element characteristic value may be calculated in the image data to be compared, and the robot body 1 may be moved by a predetermined distance corresponding to the acquired amounts of deviation in the x direction and the y direction. For example, when the blocks are deviated by px in the positive x axis direction (to the right in front of the robot) and py in the negative direction (toward backside of the robot) along the y axis (front and back direction of the robot), the robot body 1 may be moved to the right and backward by amounts corresponding to px and py.

[Movement Detection]

In the above description, the image data which is read during the teaching or during work is a still image (image of one frame). However, in the actual operation, not only the line segment of the target of work is detected from the image data, but also, a line segment is detected from the background of the location in which the target is placed. This may affect the search of image data having a similar background image.

In consideration of this, when the target of work is a moving object or the like and can be distinguished from the background by determining presence or absence of movement, it is also possible to employ a configuration in which, in the calculation of the directional line element characteristic value for image data, image data of a plurality of frames are consecutively acquired in advance, a portion having a movement is extracted based on a difference in the consecutively acquired image data, and the directional line element characteristic value is calculated for the portion having the movement.

[Three-Dimensional Process]

In addition, it is also possible to three-dimensionally view the work target and recognize the work target by a difference in distance from the image-capturing unit 14 mounted on the robot body 1 to the target and the distance from the image-capturing unit 14 to the background such as a surface of a table.

In this case, the image-capturing unit 14 is provided on both ends in the width direction of the robot body 1, and the remote control device 2 acquires both image data captured by the image-capturing units 14. The controller 21 calculates the directional line element characteristic value for each image data, searches, among the pairs of line elements having the common directional line element characteristic value in the image data, a pair having the closest distance, and calculates the difference in the distance. A pair having the difference in distance less than a threshold value is assumed to be at a relatively long distance from the robot body 1, that is, the pair is assumed to be a line element extracted from the background, and the searched pair is deleted from the memory unit 22.

With this configuration, the line element extracted from an object having a relatively close distance from the robot body 1 (which can generally be considered to be the work target) can be selectively handled as the target of the process, and the recognition precision of the work target can be improved.

[Operation]

A preferred embodiment of the present invention has the above-described structure, and, thus, operates in the following manner. Here, an example work is described in which two blocks of a shape of a rectangular parallelepiped are used and one block is placed on top of the other block. First, the operator operates the remote control device 2 to instruct start of a teaching process. Image data captured by the image-capturing unit 14 mounted on the robot body 1 is received and read by the remote control device 2. The remote control device 2 creates information related to the position and angle of the line segment included in the image data as search data.

Here, as the image data, it is assumed that an image of a state of two blocks separately placed at a relatively large distance from each other is captured (refer to (A) in FIG. 12). The line segment extracted from this image is a line segment related to the outline of each block. The remote control device 2 creates information on the position and angle of the outline.

The operator operates on the remote operation device 3 to execute an operation to move the robot body 1 to a position in which the block can be held with the packet H (forward movement operation). The remote control device 2 creates information indicating the content of the operation based on a signal which is input from the remote operation device 3, and transmits the signal instructing the content of the operation to the robot body 1. The robot body 1 receives the signal and executes the forward movement operation.

The remote control device 2 stores the originally captured image data, the search data created based on this image data, and the information indicating the content of the operation in the teaching database in correlation to each other.

Then, when the operator operates the arm and operates the packet to open and close the packet to pick up one of the blocks, and then executes an operation to move the arm and move the robot body 1 to execute an operation to place the picked-up block on the other block, the remote control device 2 stores the image data acquired before each operation is executed, search data created based on the operation, and information indicating the content of the operation in the teaching database (FIG. 12). When the operator completes the work, the operator instructs termination of execution of the program to the remote control device 2.

In other situations where two blocks are separately placed, when the operator places the robot body 1 at a farther place from the blocks than that during the teaching and instructs start of the process of work to the remote control device 2, the remote control device 2 starts an operation in the working mode.

More specifically, the remote control device 2 receives the image data captured by the robot body 1, sets the received image data as a key, extracts a line segment from the key image data, and creates information of the position and angle of the extracted line segment. Then, the remote control device 2 searches image data which is the most similar to the image data currently being captured by the robot body 1 from the image data stored in the teaching database using the created information of the position and angle of the line segment and the key image data.

Here, the remote control device 2 compares, for example, the position and angle of the line segment created from the key image data and search data recorded in the teaching database in correlation to image data, and selects the closest search data, and determines the image data correlated to the selected search data as the image data which is the most similar to the image currently being captured. As is already described, it is also possible to compare the image data itself and assign weights based on the similarity in the color or the difference in color with the adjacent pixel.

The remote control device 2 reads information of the content of the operation recorded in the teaching database in correlation to the image data which is determined as being the most similar to the image currently being captured, and transmits a signal related to the content of the read operation to the robot body 1.

In the example configuration, first, an image is captured in which two blocks are separately placed. Because the positions are such that work can be executed on the blocks, the search data of (A) is selected in the example content of the teaching database shown in FIG. 12, as the closest data. The image data of (A) is determined as the most similar to the image currently being captured. Because the operation of forward movement which is executed by the operator in the past is correlated to the image data of (A), the remote control device 2 instructs the forward movement to the side of the robot body 1.

When the forward movement which is executed by the operator in the past is completed, the remote control device 2 acquires image data captured by the robot body 1. Here, because the robot body 1 is placed at a farther apart location from the block than during teaching, the movement distance is insufficient with the forward movement operation executed by the operator in the past, and the robot body 1 is not moved to the position in which work on the block is possible.

Because of this, the search data of (A) is again selected as the closest data for the acquired image data. The image data of (A) is determined as the most similar to the image currently being captured. Because the forward movement operation executed by the operator in the past is correlated to the image data of (A), the remote control device 2 instructs the forward movement to the side of the robot body 1.

In this manner, the robot body 1 is further moved forward and the robot body 1 is moved to a position in which the work on the block is possible. At this stage, when the remote control device 2 acquires the image data captured by the robot body 1, the image data of (B) to which the movement of the arm and the opening and closing operation of the packet are correlated is selected as the most similar data for the acquired image data. The remote control device 2 thus instructs the movement of the arm and the opening and closing operation of the packet to the side of the robot body 1.

Because of this instruction, the robot body 1 moves the arm and opens the packet without moving from that position, lowers the arm and closes the arm, and starts the work to pick the block up.

In other word, in the work robot of the present embodiment, for an image captured by the robot body 1, a work executed by the operator when an image similar to the captured image is captured is repeatedly executed.

In this manner, according to the present embodiment, once the operator stores the record of successful work in the work robot, the expertise for the operation is not required and convenience can be improved. In addition, because the captured image is recalled and the work correlated to the recalled image is executed, even when the work target is not placed at a predetermined location as in the operation example described above, the work for movement to the target is continued until the image captured at the time when the work to pick the target up is executed is recalled, and then, the operations to pick up the target or the like are executed, and, thus, the usage situation can be expanded.

According to the present embodiment, a work robot can be provided which can autonomously operate with minimum human operations.

[Other Sensors]

In the above description, an example configuration is described in which the executed work is recorded with respect to the image data captured on the side of the robot body 1, the image data acquired in the past is recalled using the image data currently being captured as a key, and the work correlated to the recalled image data is executed. The present embodiment is not limited to such a configuration, and, for example, the robot body 1 may comprise a sensor (distance sensor) which measures a distance to an object (target or obstruction) in front, at the side, and in the back of the robot body 1, a tilt sensor which measures a slope of the robot body 1 in the direction of travel or the width direction, or a distortion gauge or a distance sensor for detecting whether or not the target is held by the packet.

In this case, the information of each sensor is included in the search data, a difference between the value measured by the sensor and the value included in the search data is calculated in the operation during work, a degree of similarity with the search data and a degree of similarly of the image data are added with weights, a degree of similarity between the image data and the measurement data currently being acquired and the past image data and past measurement data is calculated, a content of the operation correlated to the image data and measurement data having the greatest degree of similarity is acquired, a signal based on the content of the operation is transmitted to the robot body 1, and the robot body 1 is controlled.

According to this configuration, when, for example, the holding of the target by the packet is not successful, the state would differ, because of the detection result by the distortion gauge, from the past state in which the target is held, and it is possible to avoid a problem such as that the work is continued and the operation to move the target which is considered as being held is executed.

[Usage Example of Distance Sensor]

Alternatively, distance sensors for measuring a distance to, for example, the floor surface may be provided at an outer periphery of the robot body 1. The controller 11 of the robot body 1 may control, when a distance to the floor surface measured by one of the distance sensors (hereinafter referred to as "sensor of interest") exceeds a predetermined value (or when the value is different from the average of measurement results of the other distance sensors by an amount exceeding a predetermined threshold value), the robot body 1 to stop the operation of the robot body 1 or to move the robot body 1 in a direction opposite to the position of the sensor of interest, regardless of the instruction input from the remote control device 2. In this manner, it is possible to prevent dropping of the robot body 1 from a base when the robot body 1 is operating on the base.

Here, an example configuration is described in which the distance to the floor surface is measured. It is also possible to provide a distance sensor directed in the horizontal direction in order to detect a wall surface or obstruction, and control, by the controller 11, the robot body 1 to stop the operation of the robot body 1 or to move the robot body 1 in a direction opposite to the position of the sensor of interest regardless of the instruction input from the remote control device 2, when one of the distance sensors detects an obstruction within a predetermined distance range.

[Route Search to Achieved State]

In the above description, the operation execute by the operator in the past is correlated to the image data or measurement data before the operation is started, so that, when image data or measurement data similar to those acquired in the past is again acquired, the operation of the operator correlated to the similar image data or similar measurement data acquired in the past is again executed. However, it is also possible to store, in the teaching database, the image data and the measurement data after the operation is completed, along with the image data and the measurement data before the operation is started, in correlation to the operation executed by the operator in the meantime.

With this configuration, operation elements such as the initial state, completion state, and content of the operation are accumulated in the teaching database. Based on the image data and the measurement data at the time when the remote control device 2 receives the instruction of work and information for identifying the image data or the measurement data in a given target state, the remote control device 2 may determine a combination of the operations to reach the target state based on the combination of the data of the operation elements stored in the teaching database. This determination may be executed, for example, by a computer executing a program of symbolic inference and through a trial-and-error method. For such a program, various programs have been developed as an artificial intelligence program, and, thus, the program will not be described in detail here.

When the combination of the operations is determined, the remote control device 2 instructs the operations in the time sequential order to the robot body 1. The robot body 1 moves or executes a work according to the instruction.

[Placement of Image-Capturing Unit 14]

The image-capturing unit 14 provided on the robot body 1 of the present embodiment may be controlled to have the image-capturing range changed in connection with the movement of the arm A of the robot body 1. For example, of the arm A, in connection with the angle of elevation of the first arm unit, the tilt angle of the image-capturing unit 14 may be changed so that an image is captured in a direction closer to the horizontal direction as the angle of elevation is increased and an image is captured in a direction of the packet H (floor surface direction) when the angle of elevation is reduced (when the first arm unit becomes closer to horizontal and the packet H approaches the floor surface).

In another example configuration, as the image-capturing unit 14, a first camera which captures an image in the horizontal direction and a second camera which captures an image in the direction of the packet H may be provided. In this case, for example, when the angle of elevation of the first arm unit of the arm A is greater than a predetermined threshold value, the image of the first camera is selectively used as the key for the recalling operation. In addition, when the angle of elevation of the first arm unit of the arm A is reduced to less than a predetermined threshold value, the image of the second camera is selectively used as the key for the recalling operation. Alternatively, during the teaching also, when the angle of elevation is greater than a predetermined threshold value, the image of the first camera may be selectively used for creating the search data and updating the teaching database and, when the angle of elevation of the first arm unit A of the arm A is reduced to less than a predetermined threshold value, the image of the second camera may be selectively used to create the search data and update the teaching database.

Alternatively, the image-capturing range of the image-capturing unit 14 may be changed not in connection with the arm A, but according to a distance to the target, for example, when the distance to the target can be measured by a distance sensor or the like provided in front of the robot body 1. For example, the pan and tilt of the image-capturing unit 14 may be controlled so that the image-capturing unit 14 is directed toward the direction of the target.

In addition to changing the pan and tilt angle of the image-capturing unit 14, it is also possible to change, when a part of the captured image is cut out and a key image (or an image to be a target of teaching) is to be acquired, the range of the cutout, to change and control the image-capturing range.

[Other Alternative Configurations]

In the above description, a case in which the robot body 1 is driven with a crawler and comprises an arm and a packet is described, that is, a case is described in which the robot body 1 is a type of a shovel car. The present invention, however, is not limited to such a configuration, and the robot body 1 may be a general manipulator or a competition robot such as a robot in a robot Sumo wrestling.

The invention claimed is:

1. A work robot which executes a work to operate a target object, the work robot comprising:
   an image-capturing unit which captures an image including the target object;
   a storage unit which stores, during teaching, an image captured by the image-capturing unit and an operation content taught by an operator in correlation to each other; and
   a controlling unit which acquires, during work, an image captured by the image-capturing unit, searches the storage unit for an image which is similar to the acquired image, and operates the target object based on an operation content correlated to an image found from the storage unit as a result of the search; wherein
   the controlling unit creates information of a color included in an image captured by the image-capturing unit, and searches the storage unit for an image which is similar to the captured image by comparing information of a color difference between a pixel included in each image stored in the storage unit and a nearby pixel included in each image stored in the storage unit and the created information of a color difference between a pixel included in the captured image and a nearby pixel included in the captured image.

2. The work robot according to claim 1, further comprising a movement unit which moves the work robot in at least one of a front and back direction and a left and right direction, wherein
   the controlling unit compares the image found from the storage unit and the image captured by the image-capturing unit, and moves the work robot according to a result of the comparison.

3. The work robot according to claim 2, wherein the controlling unit creates information of an angle of a line segment of an outline included in an image captured by the image-capturing unit, and searches the storage unit for the image which is similar to the captured image by comparing information of angles of line segments of outlines included in each image stored in the storage unit and the created information of the angles of the line segments of the outlines included in the captured image.

4. The work robot according to claim 3, wherein the image-capturing unit controls an image-capturing range according to movement or operation.

5. The work robot according to claim 3, wherein the controlling unit creates information of a color included in an image captured by the image-capturing unit, and searches the storage unit for an image which is similar to the captured image by comparing information of a color difference between a pixel included in each image stored in the storage unit and a nearby pixel and the created information of a color difference between a pixel included in the captured image and a nearby pixel.

6. The work robot according to claim 3, wherein
the controlling unit creates information of a color included in an image captured by the image-capturing unit, and searches the storage unit for an image which is similar to the captured image by comparing information of a color included in each image stored in the storage unit and the created information of the color included in the captured image.

7. The work robot according to claim 6, wherein the image-capturing unit controls an image-capturing range according to movement or operation.

8. The work robot according to claim 6, wherein the controlling unit creates information of a color included in an image captured by the image-capturing unit, and searches the storage unit for an image which is similar to the captured image by comparing information of a color difference between a pixel included in each image stored in the storage unit and a nearby pixel and the created information of a color difference between a pixel included in the captured image and a nearby pixel.

9. The work robot according to claim 1,
wherein the controlling unit creates information of an angle of a line segment of an outline included in an image captured by the image-capturing unit, and searches the storage unit for the image which is similar to the captured image by comparing information of angles of line segments of outlines included in each image stored in the storage unit and the created information of the angles of the line segments of the outlines included in the captured image.

10. The work robot according to claim 9,
wherein the controlling unit creates information of a color included in an image captured by the image-capturing unit, and searches the storage unit for an image which is similar to the captured image by comparing information of a color difference between a pixel included in each image stored in the storage unit and a nearby pixel and the created information of a color difference between a pixel included in the captured image and a nearby pixel.

11. The work robot according to claim 9, wherein the image-capturing unit controls an image-capturing range according to movement or operation.

12. The work robot according to claim 1, wherein the image-capturing unit controls an image-capturing range according to movement or operation.

13. The work robot according to claim 2, wherein the image-capturing unit controls an image-capturing range according to movement or operation.

14. A work robot system comprising:
a work robot which executes a work to operate a target object according to an instruction which is input from outside; and
an operation device which outputs an instruction to the work robot, wherein the operation device comprises:
an image-capturing unit which captures an image including the target object;
a storage unit which stores, during teaching, an image captured by the image-capturing unit and an operation content taught by an operator in correlation to each other; and
a controlling unit which acquires, during work, an image captured by the image-capturing unit, searches the storage unit for an image which is similar to the acquired image, and operates the target object based on an operation content correlated to an image found from the storage unit as a result of the search; wherein
the controlling unit creates information of a color included in an image captured by the image-capturing unit, and searches the storage unit for an image which is similar to the captured image by comparing information of a color difference between a pixel included in each image stored in the storage unit and a nearby pixel included in each image stored in the storage unit and the created information of a color difference between a pixel included in the captured image and a nearby pixel included in the captured image.

15. The work robot system according to claim 14, wherein
the work robot comprises a unit which moves through autonomous movement and a sensor provided at an outer periphery of the work robot, and
when a detection result of the sensor satisfies a predetermined condition, a predetermined operation is executed regardless of an instruction from the operation device.

* * * * *